Figures 1, 10:
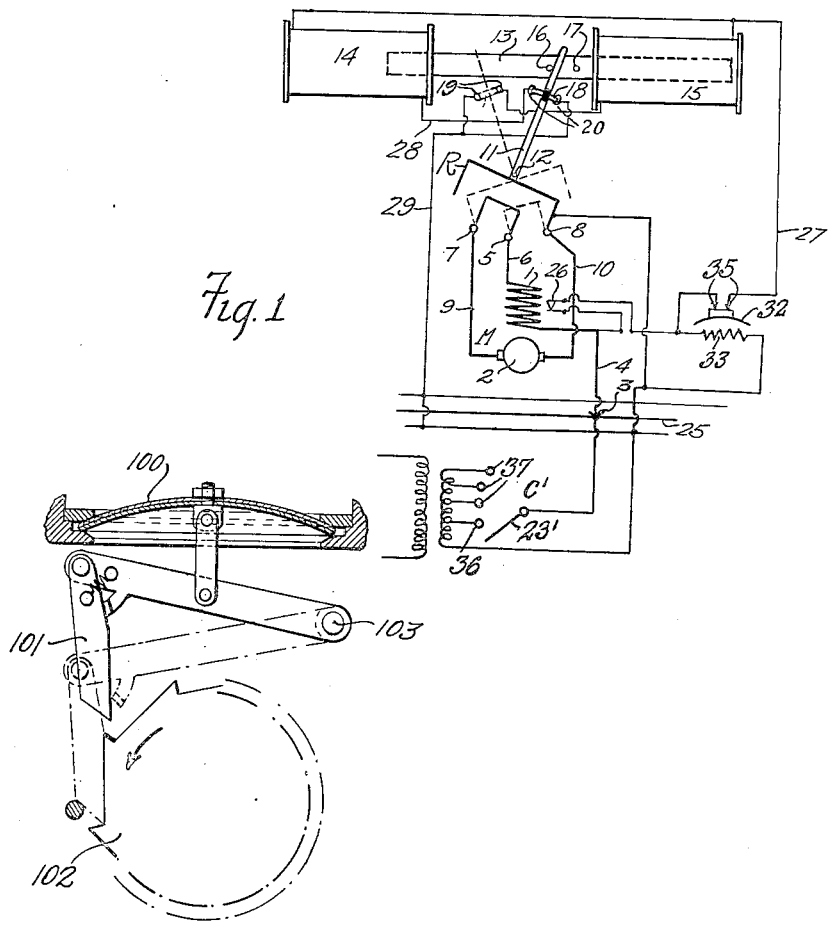

April 16, 1935.  L. W. ROSENTHAL  1,997,748
ELECTRIC MOTOR REVERSER, ESPECIALLY ADAPTED
FOR REVERSING TOY ELECTRIC LOCOMOTIVES
Filed Nov. 30, 1932   2 Sheets-Sheet 1

INVENTOR.

April 16, 1935.                L. W. ROSENTHAL                1,997,748
              ELECTRIC MOTOR REVERSER, ESPECIALLY ADAPTED
                 FOR REVERSING TOY ELECTRIC LOCOMOTIVES
                     Filed Nov. 30, 1932         2 Sheets-Sheet 2
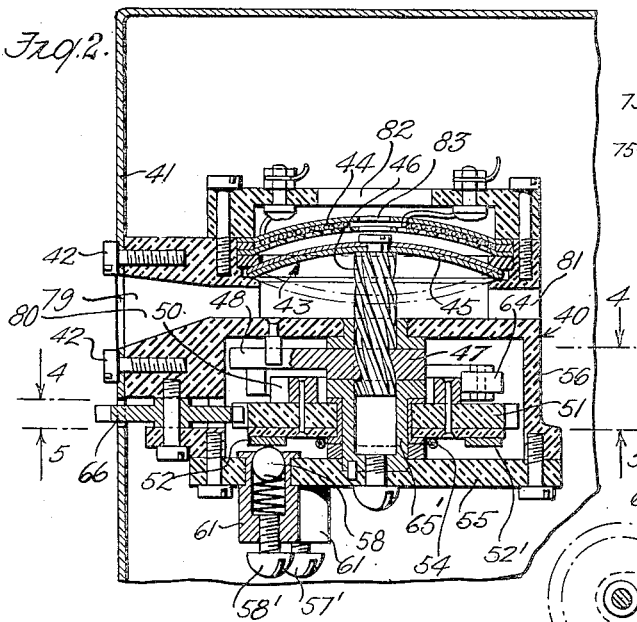
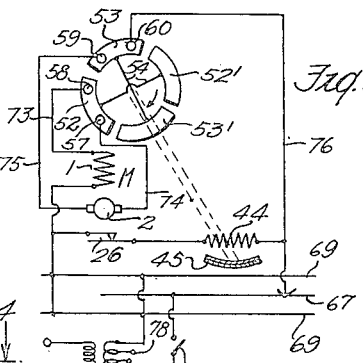
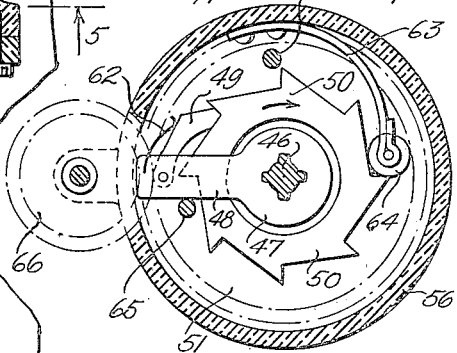
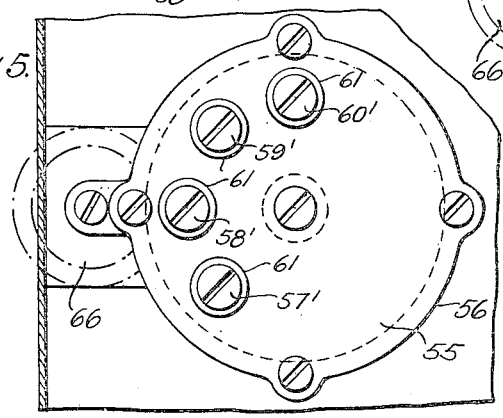
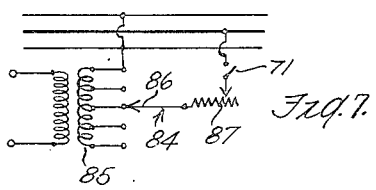
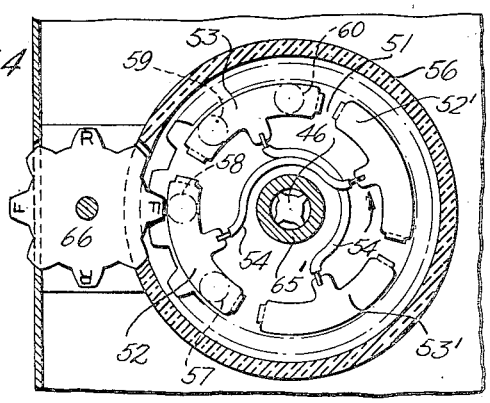
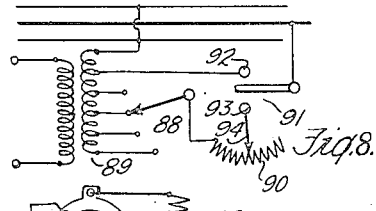
INVENTOR Patented Apr. 16, 1935

1,997,748

UNITED STATES PATENT OFFICE 1,997,748

ELECTRIC MOTOR REVERSER, ESPECIALLY ADAPTED FOR REVERSING TOY ELECTRIC LOCOMOTIVES

Leon W. Rosenthal, New York, N. Y.

Application November 30, 1932, Serial No. 644,933

2 Claims. (Cl. 104—151)

The prime object of this invention is to provide reversing mechanism for electric motors, such as the motors on toy electric locomotives, which shall be capable of being controlled from a remote point and at the will and express act of the operator. This reversing mechanism is operated by or through electrical means receiving its operating current, whether alternating or direct, through the same power and track rails or the same conductors as the motor, and said operating current is arranged to be cut off from said electrical means, in its entirety, when the motor is running. The electrical means may comprise an electromagnet operating at a voltage differentiated from that normally impressed upon the motor, or operating at the motor voltage after a voltage differentiated relay has acted to establish the operating circuit of the electromagnet; or it may comprise a thermo-responsive unit arranged to operate the reversing mechanism directly, or indirectly as by closing the electrical circuit to the electromagnet. In application to a toy electric locomotive, the reversing mechanism and its electrical means are mounted in the locomotive, while the controller for the electrical means is disposed elsewhere and preferably combined with the speed controller for the locomotive.

In the accompanying drawings illustrating some preferred embodiments of my invention, Fig. 1 is a circuit diagram of a system of control utilizing a thermostatic switch operating at an undervoltage to establish the operating circuit for the electrical means; Fig. 2 is a vertical section through a reversing unit employing a thermo-responsive unit for directly operating the reversing mechanism; Figs. 3 and 4 are sections on lines 4—4 and 5—5, respectively, of Fig. 2; Fig. 5 is a bottom view of Fig. 2; Fig. 6 illustrates diagrammatically a system of control including the reversing unit disclosed in Fig. 2; Figs. 7 and 8 illustrate modified forms of controllers; Fig. 9 illustrates diagrammatically another form of reversing mechanism; and Fig. 10 is a view, partly in section and partly in elevation, of another form of connection between the thermo-responsive unit and the reversing switch.

In Fig. 1, the motor M comprises the field coil 1 and armature 2. One end of the field coil is connected to the collector or shoe 3 by wire 4, while its other end is connected to contact 5 by wire 6. The armature is connected to contacts 7 and 8 by wires 9 and 10, respectively. The reversing switch R may be of the well known form having an arm 11 pivoted at 12 for oscillation by the reciprocable plunger 13 actuated by the coils 14 and 15 of the electromagnet. The arm is disposed between pins 16 and 17 on the plunger and carries a bridge 18 which connects contacts 19, 19 or 20, 20, as the case may be, to close the circuit to one or the other of the coils.

The normally closed switch 26 is of well known form which is automatically opened, when the stray field of motor M is built up, to open the circuit of the coils 14 and 15 from the power rail 25 at or near the time the motor starts to operate. In addition to the stray field switch 26, a thermo-responsive switch 32 in the circuit of the electromagnet coils, which switch is designed to operate, after an appropriate period of heating, at a low voltage that is lower than that at which the motor M will start. This switch comprises a heating coil 33, thermostatic element 34 and a pair of contacts 35, 35. The arrangement is intended to operate from the alternating current source in the following manner: It being desired to reverse the motor M, the arm 23' of the controller C' is first moved into engagement with the low voltage tap 36 of the secondary of the transformer and is left there until the coil 33 heats up sufficiently to operate the element 34 to bridge the contacts 35, 35. When the switch 32 has thus operated, the connection of one or the other coils of the electromagnet to the rail or conductor 25 is completed, but the voltage from tap 36 is insufficient to cause the operation of the electromagnet. In order to effectively energize the electromagnet to operate the plunger and hence the reverser, the arm 23' is then moved from tap 36 to a tap 37, the coils being designed to be operative at train voltage. The switch 32 remains closed during the interval that switch arm 23' is being moved, it taking an appreciable interval for the heating coil 33 to cool and the thermostatic element to resume its normal position. The electromagnet is designed to operate almost instantaneously when the switch arm 23' is moved to a tap 37 and before the switch 26 opens. After the reversing mechanism has been thus actuated, the arm 23' is then moved to suitably operate the motor. In due course the thermostatic element cools sufficiently to open the contacts 35, 35, and is then ready for the next reversing operation. If, on the other hand, it is desired to operate the motor M' in the direction in which it was last running, the arm 23' is merely moved from off position directly to one of the taps 37 so that the thermostatic element, as it is designed, does not have time to heat up sufficiently, even at the higher voltage, before the motor starts and the switch 26' opens.

The reversing unit 40 of Figs. 2 to 5 inclusive is shown attached within a locomotive body 41 at the front thereof by screws 42, 42. It includes a thermo-responsive unit 43, of the general operating characteristics hereinbefore specified, comprising a heating coil 44 and a thermostatic element 45 carrying a screw 46 engaged with a threaded collar 47 provided with an arm 48 to which is attached a pawl 49 for advancing the ratchet wheel 50. Fastened to ratchet 50 is a reversing switch comprising a toothed disc 51 bearing bridging contacts 52, 52' and 53, 53', the pairs being connected respectively by conductors 54, 54. The base plate 55 of the unit 40 is attached by screws to the housing 56 and carries spring-pressed ball contacts 57 to 60 and terminal screws 57' to 60' in suitable receptacles 61, 61. Bridging contacts 52, 52' and 53, 53' are circumferentially disposed about the axis of rotation of the disc 51, and the contacts 57 to 60 are disposed along an arc of said circumference so as to be appropriately engaged thereby. The pawl is constantly urged into engagement with the ratchet by leaf spring 62 (Fig. 3) carried by the arm 48, while another leaf spring 63 secured to the housing 56 and carrying a roller 64 at its extremity maintains the advanced position of the ratchet while the pawl is returned to its normal position. Stop elements 65, 65 limit the arc of movement of the arm 48 and prevent overthrow of the ratchet and limit the return stroke of the arm. The teeth of disc 51 are arranged to mesh with a toothed wheel 66 which protrudes through the front of the locomotive for manual operation.

In Fig. 2, the thermostatic element is shown in its position of rest. When the coil 44 is heated sufficiently, it snaps into the dotted position, advancing the screw into the bearing 65' and rotating the threaded collar, arm and pawl clockwise in Fig. 3 and thereby the ratchet, disc and bridging contact strips. When the heating coil cools off (as when its circuit is open), the thermostatic element snaps back into the full line position, retracting the screw which rotates in the reverse direction the threaded collar, arm and pawl to bring them back to their original position. An advantage of this form of thermostat is that its reversing operation is very fast so that arcing is thereby reduced at the reversing contacts.

The unit of Figs. 2 to 5 will now be described in conjunction with Fig. 6 which shows a toy track comprising power rail 68 and track rails 69, 69, transformer 70, switch 71 and regulator 72. As before, the motor M comprises field coil 1 and armature 2. Here one end of the field coil is shown connected by wire 73 to contact 58, while its other end is connected to the track rails. The armature is connected to contacts 57 and 59 by wires 74 and 75 respectively. Where the apparatus disclosed in Fig. 2 is used, actually wires 73, 74 and 75 will be connected to the screw terminals 58', 57' and 59' of the reversing switch contacts 58, 57 and 59. Contact 60 is connected by wire 76 to the shoe on the locomotive.

It will be seen that contact 52 bridges contacts 57 and 58, while strip 53 bridges strips 59 and 60. When switch 71 is closed, current flows through the motor in the following direction, starting with the power rail and shoe: wire 76, contact 60, strip 53, contact 59, wire 75, armature 2, wire 74, contact 57, strip 52, contact 58, wire 73, field coil to the track rails. In order to reverse the connections to the motor, the disc bearing bridging contacts 52, 53, 52' and 53' requires to be rotated so that strip 53' engages contact 57, strip 52 engages contacts 58 and 59, and strip 53 engages contact 60. The direction of current through the motor will now be, starting at the power rail and shoe: wire 76, contact 60, strip 53, wire 54, strip 53', contact 57, wire 74, armature 2, wire 75, contact 59, strip 52, contact 58, wire 73, field coil to the track rails. Actually the motor here is reversed by reversing the armature connections.

The operation of the apparatus disclosed in Fig. 2 in conjunction with the arrangement shown in Fig. 6 is as follows: Assuming the operator desires to continue operating the train in the direction last prevailing, power switch 71 is closed, and regulator 72 is moved onto the higher voltage tap 77 of the transformer secondary. This causes the motor to start and proceed in the direction last taken by it. As the stray field of the motor is thus built up it quickly opens switch 26 and thereby the circuit of the heating coil 44 so that it ceases to draw current before the thermostatic element is actuated. However, should the operator desire to reverse the direction of the train, he moves regulator arm 72 into engagement with low voltage tap 78 and closes the power switch 71. That voltage is too low to operate the motor and the switch 26 remains closed, current continuing to flow through the heating coil 44. The thermostatic element 45 finally snaps from the full line position shown in Fig. 2 to the dotted position, thereby projecting the screw 46, which turns the threaded collar 47 to advance the pawl and ratchet and hence the reversing switch so that the bridging strips reverse the connections to the armature of the motor as above indicated. After the reversing switch has been moved into such position, the regulator arm is moved to the higher voltage taps to start the motor and open the switch 26. When the heating coil has cooled off the thermostatic element snaps back into its original position.

In order to expedite the cooling off of the thermo-responsive unit when the train is in motion, an opening 79 is provided in the locomotive body so that air from the outside can readily and rapidly pass into the housing 56 through the port 80. The air then passes through an opening 81 and air also passes through openings 82 and 83 to cool the other side of the thermostatic element.

The reversing switch of Fig. 2, which comprises the disc 51 and contact strips 52, 52' and 53, 53' may be manually operated by turning the gear 66 through an arc embracing two of its teeth, alternate ones of the teeth being suitably marked F (forward) and R (reverse) to indicate in which direction the train is set to go.

Various forms of controllers may be used in place of the one shown in Fig. 6. The power controller 84 of Fig. 7 comprises a tapped transformer 85 having its adjustable arm 86 connected to a rheostat 87 with which may be combined the power switch 71. In this arrangement, reversal is accomplished by moving the rheostat arm, and perhaps the transformer arm also, to such points that the voltage impressed thereby on the power rail is not sufficient to operate the motor M or the stray field switch 26, but is high enough to cause heating of the thermostatic element 43 in an appropriate period of time. If no reversal is desired, the rheostat or transformer arm, or both, are set to impress a sufficiently high voltage on the power rail, when switch 71 is closed, to operate the motor and the switch 26 before the thermostatic element can operate. This arrangement uses the apparatus now provided for controlling the speed of the train, and furthermore has the advantage that the voltages applied to the thermo-responsive unit in the reversing period can always be just less than that required to operate the motor M and the switch 26, which means that for heavy trains, or under certain other conditions of operation, the time required for reversing can be reduced to the minimum.

In Fig. 8 the power controller 88 comprises a tapped transformer 89, a rheostat 90 and a three point switch 91 having one contact 92 connected to a low voltage tap of the transformer and its other contact 93 connected to the adjustable arm 94 of the rheostat, the resistance of which is connected to the adjustable arm of the transformer. This arrangement has the advantage that by suitably selecting the transformer tap connected to contact 92, the train cannot be started inadvertently when the switch arm is on contact 92 to reverse the motor, and the reverser will not be operated inadvertently when the switch arm is on contact 93 to start and run the train in the previous direction.

In Fig. 9, the motor M' comprises the armature 97 and split field coil 98. In one position the reversing switch 99 cuts in one half the coil for rotation of the motor in one direction, but when rotated through one eighth turn to another position, the reversing switch cuts out that half of the coil and cuts in the second half cut in to reverse the direction of rotation of the motor. Thus, whereas in the previous examples the armature connections were reversed to obtain reversal of the motor, in this instance reversal is accomplished by reversing the direction of the current through field winding.

In Fig. 10, there is shown a lever linkage between the thermostatic element 100 and the pawl 101 which advances the ratchet wheel 102 and the reversing switch connected to it. This linkage is pivoted at 103 and is moved from the full line position to the dotted position when the motor connections are reversed in the way described in connection with the embodiment of Figs. 2 to 5, with any of the controlling circuits shown in Figs. 6 to 9.

It is immaterial to this invention whether it is the armature connections that are reversed or the field connections, and it is also immaterial what form of controller is employed so long as provision is made whereby the operator may at his option and by his express act cause the reversal of the motor connections or not as he chooses. In any case, it will be seen that there have been provided arrangements for controlling at his option and only at his will and express act, the operation of a motor and reversing mechanism therefor through the rails or conductors normally supplying propelling current to the motor, and in which arrangements the current to the electrical means for actuating the reversing mechanism is designed to be cut off when the train is in operation.

Having described my invention, what I claim is:

1. The combination of a toy electric locomotive with a motor, a reversing device therefor, a heating element, a thermo-responsive element mounted upon said locomotive to be actuated by said heating element, and connected to operate the reversing device, an electromagnetic switch automatically deenergizing said heating element during operation of said motor, and means located at a stationary point adjacent the path of said locomotive for supplying current to said motor, and to said heating element at adjusted voltages to enable the heating element to be energized and the motor to be reversed or to enable the motor to be operated without reversal and without effectively energizing said heating element.

2. The combination of a toy electric locomotive with a motor, a reversing device therefor, a heating element, a thermo-responsive element mounted upon said locomotive to be actuated by said heating element, and connected to operate the reversing device, an electromagnetic switch automatically deenergizing said heating element during operation of said motor, and a tapped transformer located at a stationary point adjacent the path of said locomotive for supplying current to said motor, and to said heating element at adjusted voltages to enable the heating element to be energized and the motor to be reversed or to enable the motor to be operated without reversal and without effectively energizing said heating element.

LEON W. ROSENTHAL.